United States Patent [19]

Sato et al.

[11] Patent Number: 4,794,262

[45] Date of Patent: Dec. 27, 1988

[54] METHOD AND APPARATUS FOR MEASURING PROFILE OF THREE-DIMENSIONAL OBJECT

[75] Inventors: Yukio Sato, Wakamizu-Jutaku #1-45, 2-2-8,Wakamizu, Chikusa-ku, Nagoya-shi; Kazuo Araki, Chayagasakakoen Heights #B-211, 1-23-1, Ageha-cho, Chikusa-ku, Nagoya-shi, both of Aichi, Japan

[73] Assignees: Yukio Sato; Kazuo Araki, both of Aichi; Cadix Inc., Tokyo, all of Japan

[21] Appl. No.: 934,834

[22] Filed: Nov. 25, 1986

[30] Foreign Application Priority Data

Dec. 3, 1985 [JP] Japan ................................ 60-272254
Dec. 3, 1985 [JP] Japan ................................ 60-272253
Nov. 13, 1986 [JP] Japan ................................ 61-271251

[51] Int. Cl.$^4$ ............................................. G01B 11/24
[52] U.S. Cl. .................................... 250/560; 356/376; 358/107
[58] Field of Search ................ 250/560; 356/376, 377, 356/1; 358/107; 364/559

[56] References Cited

U.S. PATENT DOCUMENTS 4,472,056 9/1984 Nakagawa et al. ................. 358/107
4,494,874 1/1985 DiMatteo et al. .................. 356/376

FOREIGN PATENT DOCUMENTS 2560472 8/1985 France ................................ 356/376
0143204 8/1983 Japan ................................. 356/376
0200141 10/1985 Japan ................................. 356/376

*Primary Examiner*—Edward P. Westin
*Attorney, Agent, or Firm*—Koda and Androlia

[57] ABSTRACT

A method of measuring the profile of a three-dimensional object including the steps of scanning the surface of the object to be measured with a slit-ray, forming an optical image of the surface of the object on an imaging plane of a nonscanning type two-dimensional image sensor which is composed of a plurality of mutually independent photosensors, measuring each time interval between a time when the slit-ray passes a predetermined point and a time when reflected rays are received by any of each of the plurality of mutually independent photosensors, storing each of the time intervals measured in separate memory means with a one to one correspondence between the position of each of the plurality of photosensors and each of the plurality of separate memory means and determining the profile from the time interval stored.

13 Claims, 5 Drawing Sheets

METHOD AND APPARATUS FOR MEASURING PROFILE OF THREE-DIMENSIONAL OBJECT

BACKGROUND OF THE INVENTION

1. Field of the Invention

The present invention relates to a method and apparatus for measuring the profile of a three-dimensional object and, more particularly, to improvements in a method and apparatus for measuring a profile in a noncontact manner in which a light beam is projected onto the surface of a target and scanned over the surface of the target and the profile of the target is measured from the optical image of the surface of the target.

2. Description of the Prior Art

Applications of a method of measuring the profile of a three-dimensional object utilizing an optical system have been expected not only in the fields of CAD/-CAM and computer vision and as the eyes of robots, but also in somatometry and measurement and analysis of natural objects in the medical and dressmaking fields, and in other various fields including graphic design.

A stereo system is known as a typical system in several optical methods of measuring a profile. According to the stereo system, photographs of a target are taken from a plurality of visual angles by a plurality of industrial cameras, and a profile is obtained from these images.

This system is based on the principle of binocular stereoscopy, and the image data of the taken photographs are input in the form of lightness signal data over the entire imaging plane. In order to extract only a necessary profile from these data, it is inevitable to detect the correspondnng points, which requires various kinds of image processings and, hence, a large amount of memory capacity and a long processing time. Therefore, this system has not been embodied as a high-speed and simple apparatus.

Among other conventional systems, a light intersection system is most general and has been considered to be considerably practical. In this light intersection system, a spot-like or slit-like light beam is projected to a target, and image signals based on the optical image of the surface of the target are input to a computer by an image grabber. Then, from the positional information on the optical image on the imaging plane obtained as a result of processing these signals and the relative positional relationship between the light beam and the image grabber, the space coordinates of the surface of the target are obtained.

That is, according to the conventional light intersection system, for example, a light beam deflected for scanning is projected onto the surface of a target, and the optical image of the surface of the target formed by the light beam is inputted to a computer in the form of image signals by a scanning type image input device such as an ITV camera or a CCD camera.

As a result, according to this conventional system, the position of the optical image of the target is specified by subsequently electrically scanning the entire imaging plane, and this procedure is repeated for each light beam deflected for scanning. The profile of the three-dimensional object is measured from the multiplicity of data obtained in this way.

The conventional light intersection system, however, is disadvantageous in that it is necessary to scan the entire imaging plane every time each point of the surface of a target is detected and specified and, hence, it takes a very long time to measure the profile, thereby making it impossible to measure the profile in real time. Generally, the time required for scanning one field is approximately 1/60 to 1/30 second in the case of an ordinary industrial TV camera, and such slow scanning operation makes it almost impossible to measure the profile of an object at real time or to measure a moving object.

Especially, in order to measure a three-dimensional object with a practicably sufficient resolving power, it is necessary to scan many fields, so that very slow scanning by deflecting a light beam is necessary in the conventional light intersection system which requires the electrical scanning of the entire imaging plane, as described above. It is therefore impossible to measure the profile with sufficient resolving power at the real time.

SUMMARY OF THE INVENTION

Accordingly, it is an object of the present invention to eliminate the above-described problems in the prior art and to provide an improved method and apparatus for measuring the surface profile of a target at a high speed by using a light beam.

To achieve this aim, namely, to obtain the surface profile of a target at a high speed and in a noncontact manner, a method and apparatus according to the present invention are characterized in that the surface of a target is stroked over with a slit-like light beam (hereinunder referred to as "slit-ray"), and the positional information on the optical image of the surface of the target and the identifying information on the slit-ray are detected without repeating electrical scannings on the entire imaging plane as in the prior art, thereby enabling the surface profile to be subsequently measured at the real time.

The process of stroking over the surface of the target by slit-ray resembles the conventional light intersection system, but a method according to the present invention is characterized in that while the surface is stroked over with the slit-ray, the positional information on the imaging plane of the optical image of the surface of the object corresponding to the slit-ray is detected without electrical scanning of the entire imaging plane, and in that all the image addresses corresponding to each optical image are simultaneously detected.

The imaging plane is constituted by a plurality of photosensors. The positional information of an optical image on it is detected in real time on the basis of the output signal of each photosensor individually from another photosensor when it receives the light caused by the optical image. The surface profile is subsequently obtained from this positional information and the identifying information on the slit-ray itself. Thus high-speed processing is enabled and the scanning time for stroking over the target with the slit-ray is greatly reduced in comparison with the conventional system in which electrical scanning of the entire imaging plane is repeated for each projection of a light beam, so that practically efficient measurement of a moving object is also enabled.

A method of stroking over the object with a spot-like light beam may also be considered to be suitable, but in this case, the entire surface of the target must be scanned two-dimensionally. Such scanning requires a considerable time and it cannot therefore be expected that the measuring time is greatly reduced. In contrast, the method of using slit-ray described above enables one scanning to stroke over the entire surface of the target, thereby greatly reducing the measuring time. Therefore, the use of a slit-ray is preferable in the present invention. The slit-ray is deflected for scanning according to a predetermined scheme. This light deflecting operation for scanning is preferably carried out by rotating light source or a mirror. Needless to say, that operation with slit-ray in the present invention may be carried out by other scanning systems, for example, by moving the slit-ray in parallel or in a fan shape toward a predetermined point.

An identification signal on a slit-ray is used to identify the position of the slit-ray deflected for scanning. For example, if the slit-ray is fixed, a constant identification signal corresponds to the slit-ray, while at under scanning, different identification signals correspond to the different positions of the deflected slit-rays.

To state this more concretely, when the slit-ray is deflected for scanning by rotating a mirror, the identification signal may be electrically detected as an rotational angle signal which represents the rotational angle of the mirror. When the slit-ray is deflected for scanning at a constant speed, the elapsed time counted from a predetermined reset timing position may be output as the identification signal. In this way, it is possible to easily detect and output identifying information on the slit-ray in real time by using a timer, a counter, and so forth.

When the slit-ray is projected onto the surface of the target in this way, the fracture of the optical image of the surface of the target caused by the slit-ray is dependent on the optical system which receives the reflected light of the slit-ray from the surface of the target. Accordingly, in the present invention, the optical image is formed on the imaging plane of a non-scanning type image sensor. The imaging plane of this non-scanning type sensor is constituted by a multiplicity of mutually independent arrayed photosensors. Therefore, the positional information on the optical image on the imaging plane corresponds to the address of the photosensor. Since each of the photosensors detects the light caused by the optical image and outputs a signal individually from another sensor, the above-described merits obtained by the use of the slit-ray are utilized. When the optical image on the imaging plane moves with the scanning of the slit-ray over the surface of the target, the positional information on the moving optical image is detected by means of a light response output signal from each photosensor constituting the imaging plane. Thus, in the present invention it is possible to obtain the positional information on the optical image at the real time without electrically scanning the entire imaging plane.

If it is assumed that the slit-ray projection device, the non-scanning type image sensor and the target are fixed respectively at a certain moment, the position of the optical image of the surface of the target on the imaging plane produced by the slit-ray is definitely specified by the surface profile of the target itself. Therefore, it is very easy to measure the surface profile from the identifying information on the slit-ray and the positional information on the optical image of the surface of the target on the imaging plane of the image sensor obtained in the above-described way.

Thus, according to the method of the present invention, since it is possible to obtain the desired information at the real time without electrically scanning the image sensor for each slit-ray, high-speed measurement of the surface profile of a three-dimensional object is enabled.

In the embodiments of the present invention, slit-ray is formed by using a laser or the like and is projected to a target by a light deflector and scanner. The reflected image from the surface of the target produced by the slit-ray is formed on the imaging plane which is composed of mutually independent arrayed photosensors. The identifying information on the slit-ray is stored in the array of storage cells consisting of analog or digital memories, flip-flops, shift registers, etc. which correspond to the respective photosensors, triggered by the light response output signal of the photosensor supplied when the optical image passes each photosensor on the imaging plane. Accordingly, the address of each memory element corresponds to the positional information on the optical image on the imaging plane and the data which the memory element holds corresponds to the slit-ray identifying information.

As described above, in the present invention, a slit-ray is projected onto the surface of a target to stroke over the surface thereof during scanning by deflecting the slit-ray. The optical image at the imaging plane caused by that slit-ray projection moves on the imaging plane in correspondence with scanning of the slit-ray. The position of this moving optical image on the imaging plane is detected at the real time by means of the light response output signal from each photosensor constituting the imaging plane, without repeating the electrical scanning over the entire imaging plane as in the prior art. From this positional information and the slit-ray identifying information which is also detected in real time, the space coordinates of the surface of the target are specified. Thus, the present invention enables the configuration of a measuring apparatus which is sufficiently capable of following high-speed scanning of slit-ray and, hence, enables high-speed measurement of the surface profile of a three-dimensional object.

The above and other objects, features and advantages of the present invention will become clear from the following description of the preferred embodiments thereof, taken in conjunction with the accompanying drawings.

DESCRIPTION OF THE PREFERRED EMBODIMENTS

Embodiments of the present invention will be described hereinunder with reference to the accompanying drawings.

Figure 1:
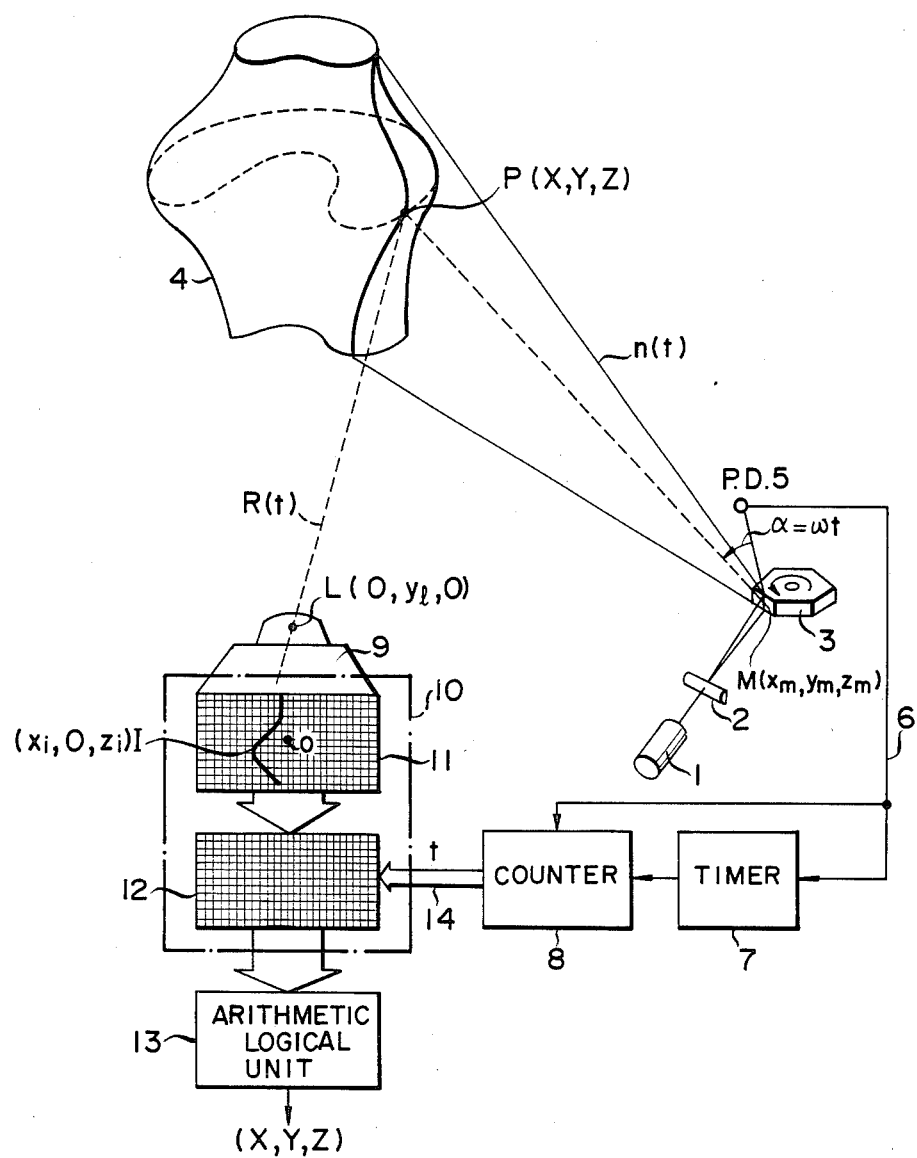
FIG. 1 is an explanatory view of an embodiment of a measuring apparatus used in a method of measuring the surface profile of a three-dimensional object according to the present invention.

FIG. 1 shows a fucctional structure of a system for measuring the surface profile of a target by a light beam consisting of slit-ray.

The laser beam from laser source 1 is perpendicularly magnified by a lens system 2 including a cylindrical lens and constitutes slit-ray, which is projected onto the surface of a target 4 through a polygonal mirror 3. The slit-ray is deflected by projection angle sequentially by the rotation of the polygonal mirror 3, as shown in FIG. 1, whereby the surface of the target 4 is stroked over. The deflection angle of the slit-ray is definitely determined by the rotational angle of the polygonal mirror. Therefore, the slit-ray may be identified by directly measuring the rotational angle of the polygonal mirror. Alternatively, since the polygonal mirror is ordinarily controlled to have rotational movement at a constant angular velocity and the slit-ray is thereby also deflected for scanning at a constant angular velocity and the slit-ray is thereby also deflected for scanning at a constant angular velocity $\omega$, it is possible to identify the slit-ray by measuring the elapsed time t from a reset (trigger) signal 6 which is output when the slit-ray passes a certain reference position. Since the identifying information on the slit-ray deflected in this way is dependent upon the time t, the time t is represented as the identifying information on the slit-ray and is used in the later calculation. The slit-ray itself is represented by n(t) in FIG. 1.

In the example shown in FIG. 1, a photosensor 5 such as a phototransistor is provided for detecting a reference position, and when the slit-ray passes across the photosensor 5, the reset (trigger) sigaal 6 is output, which triggers a timer 7 and a clock counter 8. Thus, the clock counter 8 outputs a signal representing the elapsed time t which gives the identifying information on the slit-ray n(t) in real time.

It will therefore be understood that according to the present invention, the deflection angle of the slit-ray n(t) which strokes over the surface of the target 4 is specified by the identiyying information of the elapsed time t.

The reflected light which is reflected from the surface of the target 4 is received by an imaging device 9, and the slit-like optical image of the surface of the target 4 which corresponds to the slit-ray n(t) is formed on the imaging plane 11 of an image sensor 10.

In this embodiment, the image sensor 10 is composed of a non-scanning image sensor such as a picture synchronous image sensor, and the imaging plane 11 is composed of mutually independent one-dimensionally or two-dimensionally arrayed separate photosensors. Each photosensor corresponds to each picture element. Since the image information on the imaging plane 11 is individually detected for each picture element, parallel processing is enabled. Therefore, when the slit-like optical image moves on the imaging plane 11, it is possible to detect the positional information on the entire slit-like optical iaage, for example, all the addresses of the picture elements corresponding to the slit-like optical image, simultaneously and in real time, on the basis of the output signal supplied when each photosensor on the imaging plane 11 receives the light caused by the optical image.

Thus, the positional information on the optical image of the surface of the target 4 is detected without electrically scanning the imaging plane 11 each time as in the prior art.

The identifying information t on the slit-ray n(t) detected in the above-described way and the corresponding positional information on the imaging plane 11 on the optical image of the surface of the target are coordinatingly latched in a memory unit 12 of the image sensor 10, and is operated by a combine processing part 13 to be converted to the space coordinates of the surface of the target.

In other words, according to the present invention, it is possible to coordinatingly detect both the identifying information t on the slit-ray n(t) and the corresponding positional information on the slit-like optical image in real time, and thereby to measure the surface profile of the object 4 at a high speed.

Figure 2:
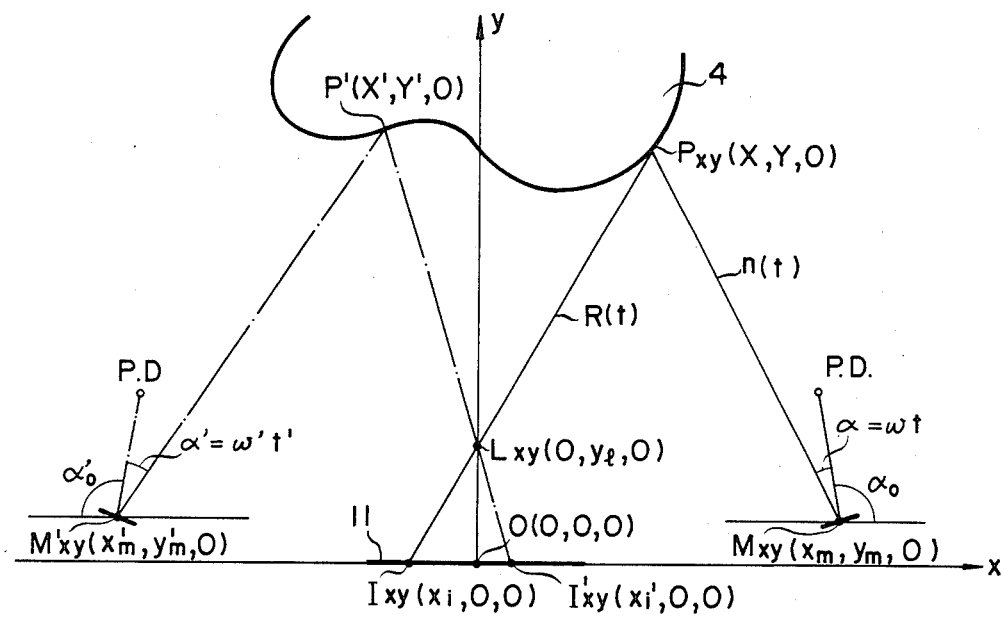
FIGS. 2 and 3 are explanatory views of the principle of the method of measuring the surface profile of a three-dimensional object using the apparatus shown in FIG. 1.
Figure 3:
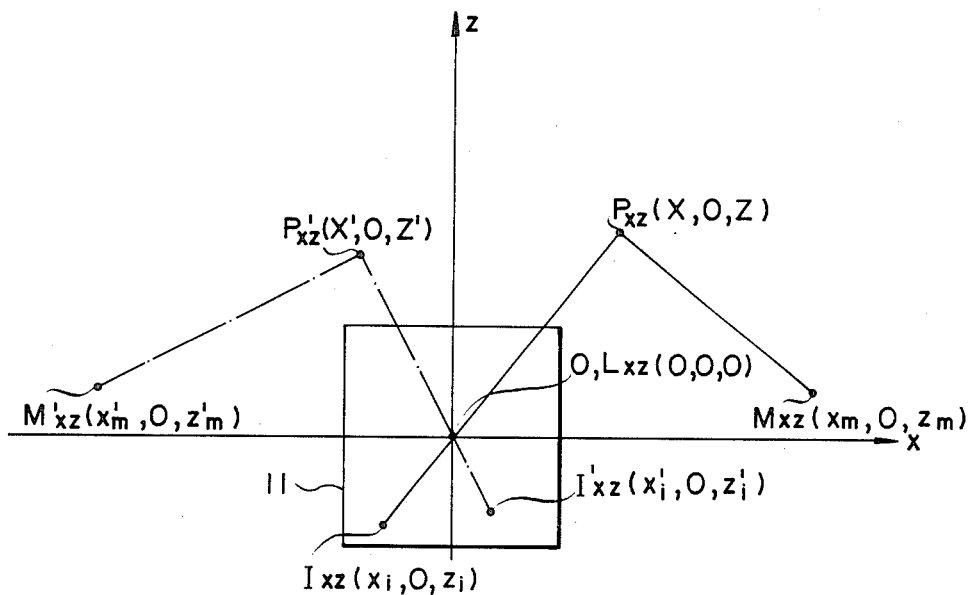

Referring to FIGS. 2 and 3, it is shown that the surface profile of the objcct 4 in the embodiment shown in FIG. 1 is specified from the identifying information on the slit-ray and the positional information on the optical image. In FIGS. 2 and 3, the geo-optical relationship between the slit-ray n(t) reflected from the center M (xm, ym, zm) of mirror reflection shown in FIG. 1, the point P (X, Y, Z) on the surface of the target 4 which is irradiated with the slit-ray n(t), and the optical image I (x, 0, zi) on the imaging plane is projected on the plane xy (FIG. 2) and the plane xz (FIG. 3).

The solid lines in FIGS. 2 and 3 denote a state in which the target is scanned with a single slit beam by using a single light projection device, and the dot-dashed lines denote a state in which the target is scanned with a second slit-ray beam by providing a second light projection device at a different position from that of the first one. By using two light projection devices in this way, it is possible to greatly reduce the unmeasurable surface area of a target having a projection or a recess, which would be in the shade if the target is scanned with a single slit-ray.

In FIGS. 2 and 3, the origin of the orthogonal coordinate system (x, y, z) is set, for example, at the center 0 of the imaging plane 11, the axis x is set in the horizontal direction and in parallel to the imaging plane 11, the axis y is set in coincidence with the optical axis and the axis z is perpendicular to the xy plane.

Therefore, the coordinate value (X, Y, Z) of the point P on the surface of the target 4 is specified by the slit-ray n(t) and the reflected light R(t), as shown in the drawings, and is obtained in the following way by using the coordinate values of the positions of the lens L and the mirror M, and the angular velocity $\omega$ of the slit-ray, all of which are set as the measuring conditinns, and the identifying information t on the slit-ray n(t) and the coordinate value (xi, 0, zi) of the optical image I of the point P, all of which are obtained as the results of measurement:

O: the center of the imaging plane (the origin of the orthogonal coordinate system)

O (0, 0, 0)

L: the center of the lens of the imaging device 9

L (0, y₁, 0)

M, M': the center of mirror reflection

M (xm, ym, zm)

M' (xm', ym', zm')

P, P': the point on the surface of the target

P (X, Y, Z)

P' (X', Y', Z')

I, I': the optical image of the points P, P'

I (xi, yi, zi)

I' (xi', yi', zi')

I (xi, yi, zi)

I' (xi', yi, zi')

P.D.: the reference point of a light beam (the position of counter set timing)
$\alpha_0$, $\alpha_0'$: the angle between the reference position of the slit-ray and the axis x
$\alpha$, $\alpha'''$ the angle between the slit-ray and the reference position of the slit-ray
$\omega$, $\omega'$: the angular velocity of the slit-ray
t, t': the elapsed time after the slit-ray has passed the reference position
subscript xy, subscript xz: the projected point of each of the points L, M, M', P, P', I' I on the plane xy and the plane xz, respectively line $I_{xy}L_{xy}P_{xy}$:

$$y - y_l = \frac{0 - y_l}{xi - 0} (x - 0)$$

which simplifies to $$y = -\frac{y_l}{xi} x + y_l$$

The equation (1) then holds:

$$Y = -\frac{y_l}{xi} x + y_l$$

line $M_{xy}P_{xy}$:

$$y - ym = \tan(\alpha + \alpha_0) \cdot (x - xm)$$

The equation (2) then holds:

$$Y = \tan(\alpha + \alpha_0) \cdot (X - xm) + ym$$

line $I_{xz}L_{xz}P_{xz}$:

$$z - 0 = \frac{zi - 0}{xi - 0} (x - 0)$$

which simplifies to $$Z = \frac{zi}{xi} X \quad (3)$$

From (1) and (2), the equation (4) is obtained $$X = \frac{xi \cdot (y_l - ym) + xi \cdot xm \cdot \tan(\alpha + \alpha_0)}{y_l + xi' \cdot \tan(\alpha + \alpha_0)} \quad (4)$$

In the equations (2) and (4), $\alpha$ is a product of the angular velocity $\omega$ of the slit-ray and the identifying information t, namely, $\alpha = \omega t$, and as a result, the equations (2) and (4) are represented as follows:

$$Y = \tan(\omega t + \alpha_0) \cdot (X - xm) + ym \quad (5)$$

$$X = \frac{xi \cdot (y_l - ym) + xi \cdot xm \cdot \tan(\omega t + \alpha_0)}{y_l + xi \cdot \tan(\omega t + \alpha_0)} \quad (6)$$

From the equations (3), (5) and (6), it will be understood that the three-dimensional coordinate value (X, Y, Z) at the point P on the surface of the target 4 is determined by both the identifying information on the slit-ray n(t), namely, the elapsed time t from a predetermined reset timing and the positional information (xi, 0, zi) on the optical image I on the imaging plane 11.

Figure 4:
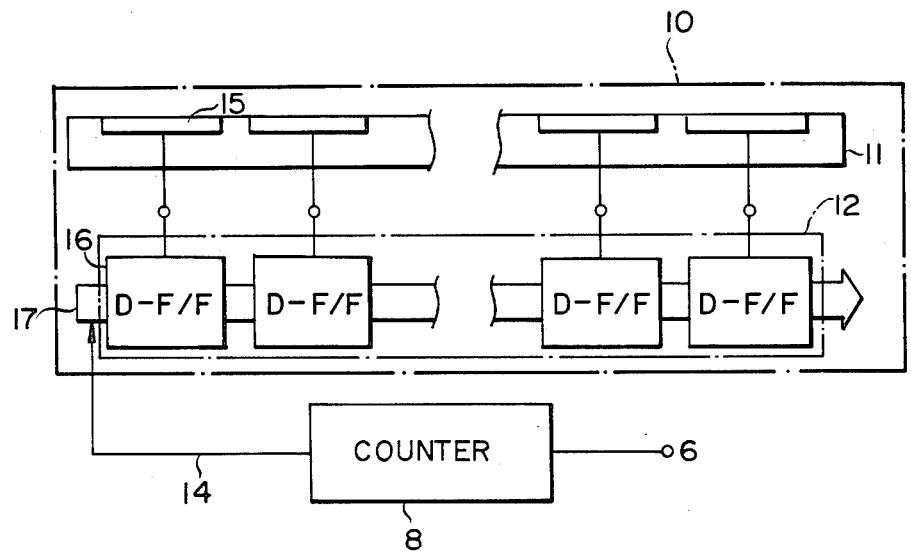
FIG. 4 is an explanatory view of an example of preferred image sensors suitable for the apparatus shown in FIG. 1.

FIG. 4 shows an example of a non-scanning type image sensor for latching and storing the identifying information on the slit-ray n(t) and the positional information on the optical image on the imaging plane 11 of the image sensor 10.

The non-scanning type image sensor is composed of the imaging plane 11 and the memory unit 12.

In FIG. 4, the imaging plane 11 is composed of a plurality of mutually independent arrayed phototransistors 15.

As is clear from the above explanation, the light reflected from the target 4 is received by the imaging device 9, and the optical image of the surface of the target 4 is formed on one of the phototransistors 15 on the imaging plane 11.

The light response output of the phototransistor 15 is supplied to the memory unit 12.

The memory unit 12 is composed of storage cells 16 arranged in correspondence with respective phototransistors 15 on the imaging plane 11. Each of the storage cells 16 of the memory unit 12 is composed of, for example, D type flip-flops of a plurality of bits or shift registers. The memrry unit 12 may also be composed of analog storage cells.

In any case, the storage cell 16 is provided in correspondence with the phototransistor 15, and into its write control input terminal is input a light response output from the corresponding phototransistor 15. Further, the identifying information 14 on the slit-ray n(t) is input to a data input bus 17 of the storage cell 16.

In this example, the identifying information 14 consists of the output of the counter 8 which starts counting in accordance with the set trigger signal 6 obtained from the light projection device. As described above, the counter 8 starts to count from the initial position of the polygonal mirror 3, and the elapsed time signal t, which is the output of the counter 8, is supplied from the input bus 17 to each storage cell 16 as the identifying information on the slit-ray n(t).

Therefore, the phototransistor 15 on which the optical image is formed outputs a light response signal, and triggers the corresponding storage cell 16. The thus-triggered storage cell 16 latches the corresponding elapsed time as the identifying information on the slit-ray n(t).

In other words, when the surface of the target 4 is stroked over by the slit-ray n(t) deflected for scanning, each identifying information on the slit-ray n(t) is stored and held in the storage cell 16 corresponding to each position of the formed image during scanning. At this time, since the address of each storage cell 16 provides this positional information on the optical image on the imaging plane 11, the above-described process is a process for storing and holding the identifying information on the slit-ray n(t) coordinatingly with the positional information on the corresponding optical image on the imaging plane.

Since this information storing process does not include any process for electrically scanning the image sensor unlike the prior art, it is quite possible for the scanning of the surface of the target to catch up with high-speed scanning of the surface of the target 4 with the slit-ray.

The data stored in this way are read from each storage cell 16 by a known method, and is converted to the space coordinates (X, Y, Z) of the surface of the three-dimensional object on the basis of the above-described measuring principle.

Figure 5:
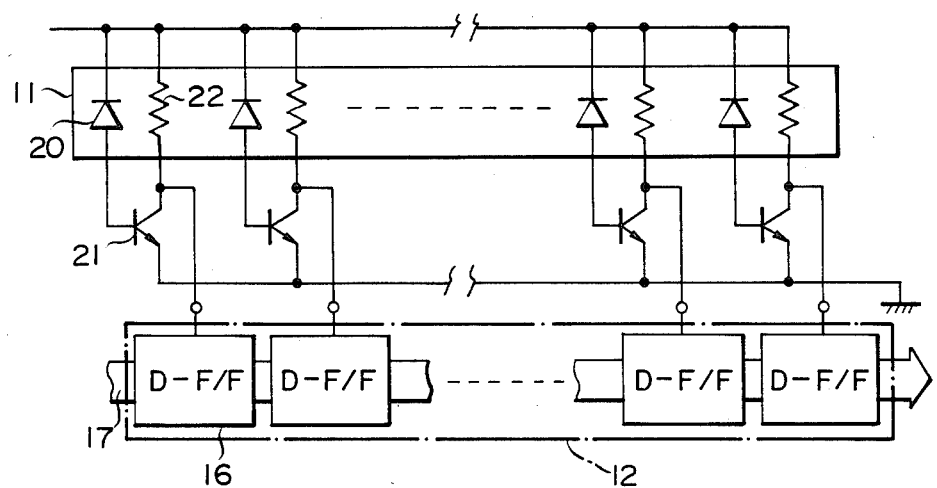
FIG. 5 is a more detailed explanatory view of another example of image sensors which resembles that shown in FIG. 4.

FIG. 5 shows another example of the image sensors which resembles the one shown in FIG. 4. In this image sensor, mutually nndependent arrayed photodiodes are used.

Since the image snnsor 10 is composed of arrayed photodiodes 20, the output thereof is amplified by transistors 21. Each of the photodiodes 2 and a resistor 22 are conneoted to the base and the collector of each transistor 21 in series. The emitter of each transistor 21 is grounded.

The memory unit 12 composed of D type flip-flops or resistors, as is the case that shown in FIG. 4, is coordinatingly connected to each group of the photodiode and transistor, and the collector terminal of the transistor 21 is connected to the write control input terminal of each of the storage cell 16.

Therefore, when an optical image is formed on the receiving surface of the photodiode 20 on the imaging plane of the imaging device, the transistor 21 which is connected to the photodiode 20 is switched on, and the output voltage of the collector is changed from the "H" level to the "L" level, whereby the coreesponding storage cell 16 is triggered and the time data representing the identifying information of the slit-ray which is connected to the data input bus 17 is latched and stored, in the same way as in the case shown in FIG. 4.

In the image sensor shown in FIG. 5, both the identifying information on the slit-ray and the positional information on the optical image are also stored and held without delay and, as a result, it is possible to control the speed of scanning the surface of the target 4 by the slit-ray n(t) at a high speed.

The non-scanning type image sensors shown in FIGS. 4 and 5 can be integrated into IC chips in the present art, and there is every reason to expect a miniaturized image pickup device.

However, in the case of constituting a non-scanning type image sensor composed of two-dimensionally arrayed photosensors by combining ordinary individual elements, signal processing elements and storage cells occupy a large area, so that the image sensor may actually become large-sized. The configuration shown in FIG. 6 will solve such a problem.

Figure 6:
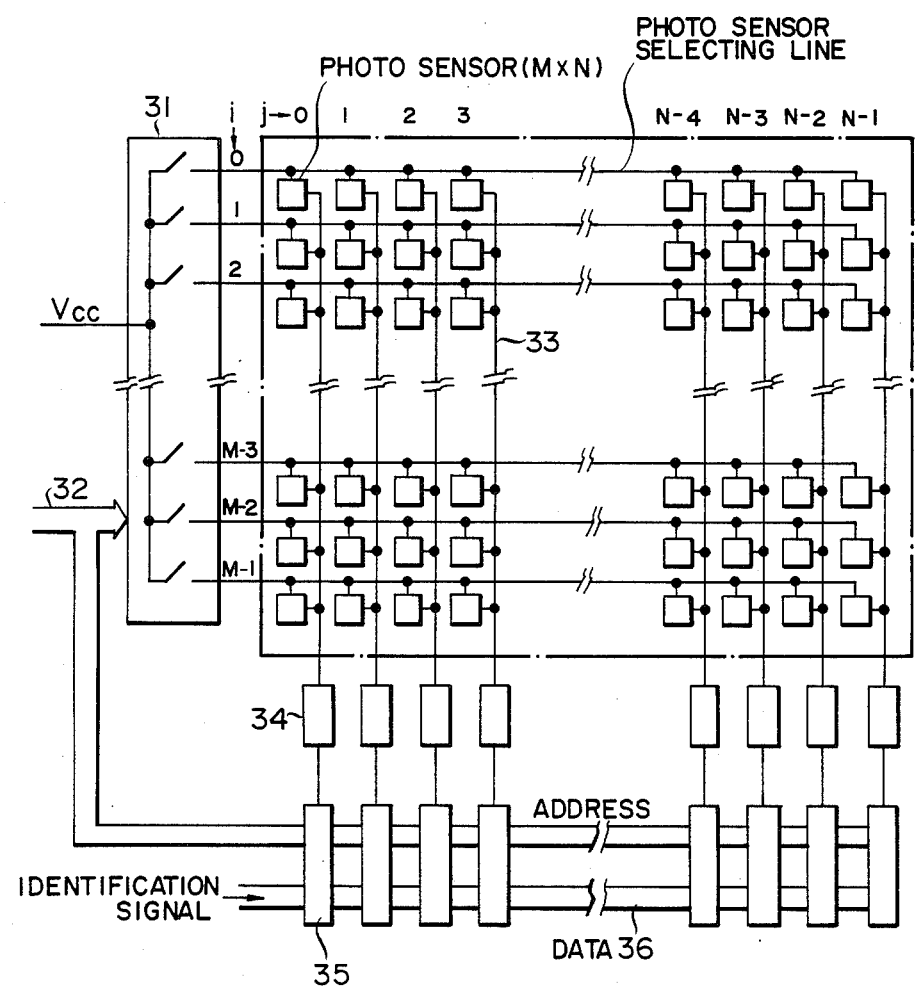
FIG. 6 shows the arrangement of image sensors of an imaging device.

In FIG. 6, the image sensor includes a group of M×N picture element photosensors which are two-dimensionally arrayed to constitute the desired imaging plane. These photosensor group are provided with M row addresses i=0, 1, 2, . . . M−1, and N column addresses j=0, 1, 2, . . . N−1, as shown in FIG. 6.

These photosensor group is divided into sub-groups in accordance with the row address i, and are selectively energized by a switching element 31 such as a multiplexer. When the divided sub-groups of photosensors are selectively energized by the switching element 31, they are controlled by a row address signal which is supplied from a row address signal line 32 to a switching element 31.

On the other hand, the output terminals of the photosensors of a sub-group having the same column address j are connected to a common output line 33. In other words, N sub-groups of photosensors having the same column address j are formed by N common output lines 33.

The outputs of the photosensor sub-groups fetched from the respective common output lines 33 are supplied to the write control input terminals of the respective memory units 35 through respective signal processing elements 34. The number of the signal processing elements 34 and the memory units 35 provided are respectively N in correspondence with the common output lines 33.

A row address signal is supplied from the row address signal line 32 to the address bus of the memory unit 35, and a slit-ray identifying signal is suppled to a data bus 36.

In the imaging device shown in FIG. 6, as soon as the desired address group is selectively energized on the basis of a row address signal, the storage cell which corresponds to the selected row address in the memory unit 35 is energized.

In this state, when the surface of the target is scanned once by the slit-ray, the slit-ray identifying signal, which is output at the moment when the optical image has passed the picture element photosensor of the row address group which is selectively being energized, is stored and held in the memory unit 35, as described above.

Accordingly, all information necessary for measuring the profile of the target is obtained by repeating this cycle of scanning M times with respect to each row address group.

In the imaging device shown in FIG. 6, since the signal processing element and the memory unit are not required for each picture element photosensor unlike the example shown in FIG. 4, and the number of the output lines is greatly reduced, it is possible to greatly reduce the size of the device, which is very useful for a device which is composed of individual elements.

Figure 7:
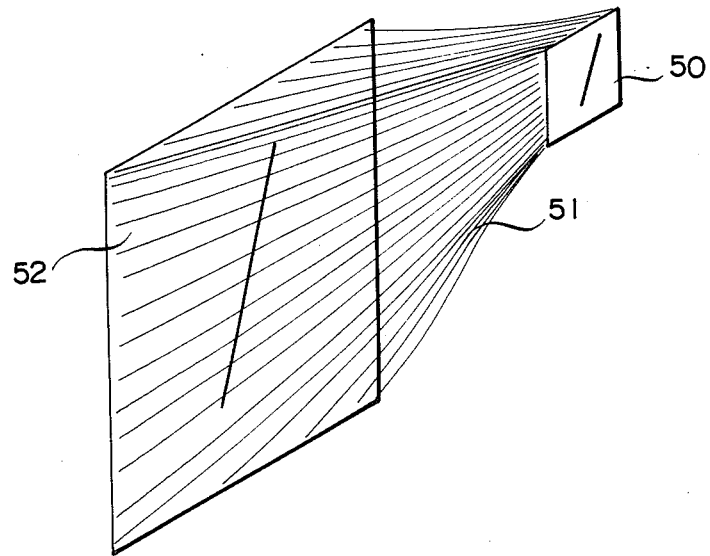
FIG. 7 is an explanatory view of another example of imaging devices which use an optical fiber.

FIG. 7 shows an example of imaging devices adopting an optical fiber which are suitable for the present invention. One end surface of each of the optical fibers 51 is arrayed on an imaging plane 50, on which the optical image is formed. The other end of the optical fiber 51 is led to the arranging surface of arrayed photosensors 52. The arrayed photosensors 52 are actuated by the light introduced through the optical fibers 51.

Accordingly, in the example shown in FIG. 7, even if the arrayed photosensors 52 are large, it is possible to make the imaging plane 50 itself compact, thereby enabling the imaging part of the device to be miniaturized.

As described above, according to the present invention, the surface of a target is stroked over by slit-ray, and the positional information on the optical image which moves on the imaging plane with the movement of the scanned light is detected at the real time on the basis of an output signal supplied when each photosensor which constitutes the imaging plane receives the light caused by the optical image, without the need for repeated electrical scanning on the entire imaging plane as in the prior art. It is possible to measure the surface profile of the target at a high speed from this positional information and the identifying information on the slit-ray which is also detected at the real time. Such high-speed scanning of the surface of a target with the slit-ray also enables very accurate profile measurement with respect to a moving target.

While there has been described what are at present considered to be preferred embodiments of the invention, it will be understood that various modifiaations may be made thereto, and it is intended that the appended claims cover all such modifications as fall within the true spirit and scope of the invention.

What is claimed is:

1. A method of measuring the profile of three-dimensional object comprising the steps of:
   scanning the surface of an object to be measured with a measuring slit-ray;
   forming an optical image of the surface of said object by means of said measuring slit-ray on an imaging plane of a non-scanning type two-dimensional image sensor which is composed of a plurality of mutually independent arrayed photosensors;
   measuring each time interval between a first time when said slit-ray passes a predetermined point and a second time when reflected rays from said slit-ray scanning said object are received by any of each of said plurality of mutually independent arrayed photosensors;
   storing each of said time intervals measured in predetermined ones of a plurality of separate memory means with a one to one correspondence between the position of each of said plurality of photosensors and each of said predetermined ones of said plurality of separate memory means; and
   determining the profile from the time intervals stored in each of said predetermined ones of a plurality of separate memory means.

2. A method according to claim 1, wherein said measuring slit-ray strokes over said surface of said object to be measured at a constant angular velocity.

3. A method according to claim 1, wherein said object is scanned by said slit-ray by projecting a slit-ray from a laser source onto a constantly rotating polygonal mirror.

4. A method according to claim 3, wherein said time interval is measured by sensing when said slit-ray passes a predetermined point using a photosensor to generate a pulse, beginning counting a series of clock pulses with a counter means when said pulse is generated and determining a count in said counter when said reflected rays are received by any one of each of said plurality of photosensors.

5. A method according to claims 1, 2, 3 or 4 wherein said surface of said object to be measured is stroked over by at least two slit-ray beams which are radiated from different positions for scanning at different timings so as to reduce an unmeasurable area of a surface of said object to be measured which has a projection or recess.

6. An apparatus for measuring the profile of three-dimensional object comprising:
   a means for scanning a surface of an object to be measured with a measuring slit-ray;
   a non-scanning type two-dimensional image sensor which is composed of a plurality of mutually independent arrayed photosensors and which form an imaging plane onto which an optical image on the surface of said object is formed by reflected rays from said slit-ray scanning of said object;
   means for measuring each time interval between a first time when said slit-ray passes a predetermined point and a second time when reflected rays from said slit-ray scanning said object are received by any of each of said plurality of mutually independent arrayed photosensors;
   storing means for storing each of said time intervals measured in predetermined ones of a plurality of separate memory means with a one to one correspondence between the position of each of said plurality of photosensors and each of said predetermined ones of said plurality of separate memory means; and
   a means for determining the profile of the object from the time intervals stored in each of said predetermined ones of a plurality of separate memory means.

7. An apparatus according to claim 6, wherein the group of said photosensors is composed of a group of M×N picture element photosensors which is divided into sub-groups of picture element photosensors in accordance with the address of the row of said photosensors, and each of said sub-groups is selectively energized by a multiplexer to fetch a signal with one scanning of said slit-ray, this process being repeated M times.

8. An apparatus according to claim 6, wherein said slit-ray is scanned over the surface of said object at a constant angular velocity.

9. An apparatus according to claim 6, wherein said scanning means comprises a constantly rotating polygonal mirror and a laser source for projecting a slit-ray onto said constantly rotating polygonal mirror.

10. An apparatus according to claim 9, wherein said measuring means comprises a photosensor through which said slit-ray passes as it scans said object to generate a pulse, a source of clock pulses, a counting means for counting a series of clock pulses from said clock pulse generating means when said pulse is generated by said photosensor and a means for determining the count in said counter when said reflected rays are received by any of each of said plurality of photosensors.

11. An apparatus according to any of claims 6, 8, 9 and 10, further comprising at least two scanning means at different positions for scanning said object with two different slit-ray beams at two different timings so as to reduce an unmeasured area of a surface of said object to be measured.

12. An apparatus according to any of claims 6, 7, 8, 9, or 10 wherein said imaging plane and said photosensors are connected by optical fibers.

13. An apparatus according to claim 11, wherein said imaging plane and said photosensors are connected by optical fibers.

* * * * *